(12) United States Patent
Hwang et al.

(10) Patent No.: US 7,613,244 B2
(45) Date of Patent: Nov. 3, 2009

(54) SYSTEM FOR COMMUNICATING CHANNEL QUALITY INFORMATION

(75) Inventors: In-Seok Hwang, Seoul (KR);
Jang-Hoon Yang, Seongnam-si (KR);
Jeong-Heon Kim, Anyang-si (KR);
Jee-Hyun Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 722 days.

(21) Appl. No.: 11/273,263

(22) Filed: Nov. 15, 2005

(65) Prior Publication Data

US 2006/0120470 A1 Jun. 8, 2006

(30) Foreign Application Priority Data

Nov. 15, 2004 (KR) .................... 10-2004-0093269

(51) Int. Cl.
*H04K 1/10* (2006.01)
*H04L 27/28* (2006.01)

(52) U.S. Cl. ............ 375/260; 375/219; 375/220; 375/221; 455/70

(58) Field of Classification Search ......... 375/219–221, 375/260; 455/70
See application file for complete search history.

(56) References Cited

U.S. PATENT DOCUMENTS

2007/0274253 A1* 11/2007 Zhang et al. ............... 370/328
2008/0108310 A1* 5/2008 Tong et al. ................. 455/69

* cited by examiner

*Primary Examiner*—Curtis B Odom
(74) *Attorney, Agent, or Firm*—Roylance, Abrams, Berdo & Goodman, L.L.P.

(57) ABSTRACT

In transmitting channel quality information (CQI) by a mobile station (MS) in a communication system, the mobile station receives from a base station (BS) information of an allocation of a CQI channel and information as to a modulation to be performed on the CQI. CQI channel signal is generated based on the CQI and the modulation information, where the CQI corresponds to a measured channel state. The CQI channel signal is transmitted to the BS over the allocated CQI channel.

7 Claims, 6 Drawing Sheets

SYSTEM FOR COMMUNICATING CHANNEL QUALITY INFORMATION

PRIORITY

This application claims the benefit under 35 U.S.C. § 119(a) of an application filed in the Korean Intellectual Property Office on Nov. 15, 2004 and assigned Serial No. 2004-93269, the entire contents of which are hereby incorporated by reference.

BACKGROUND OF THE INVENTION

1. Field of the Invention

The present invention relates generally to a communication system for communicating channel quality information (CQI) (e.g., a base station/BS).

2. Description of the Related Art

The Institute of Electrical and Electronics Engineers (IEEE) 802.16e communication system is a communication system employing an Orthogonal Frequency Division Multiplexing (OFDM)/Orthogonal Frequency Division Multiple Access (OFDMA) scheme to support a broadband transmission network for physical channels of the wireless MAN system. While the IEEE 802.16e communication system is discussed in detail along with its problems, similar problems may also arise in other communication systems including but not limited to Code Division Multiple Access (CDMA) and Time Division Multiple Access (TDMA) systems, and the present invention may be applied in any one of those communication systems.

With reference to FIG. 1, a description will now be made of a configuration of the IEEE 802.16e communication system.

FIG. 1 is a diagram schematically illustrating a configuration of a general IEEE 802.16e communication system.

Referring to FIG. 1, the IEEE 802.16e communication system has a multi-cell configuration, i.e., has multiple cells of a cell 100 and a cell 150. The multi-cell configuration includes a base station (BS) 110 for managing the cell 100, a BS 140 for managing the cell 150, and a plurality of mobile stations (MSs) 111, 113, 130, 151 and 153. Signal exchange between the BSs 110 and 140 and the MSs 111, 113, 130, 151 and 153 is achieved using the OFDM/OFDMA scheme. Among the MSs 111, 113, 130, 151 and 153, the MS 130 is located in a boundary, i.e., handover region, between the cell 100 and the cell 150. That is, if the MS 130 moves to the cell 150 managed by the BS 140 in the course of exchanging signals with the BS 110, its serving BS is changed from the BS 110 to the BS 140.

In the IEEE 802.16e communication system, various schemes are being used to support high-speed data transmission, and the typical scheme is an Adaptive Modulation and Coding (AMC) scheme. The AMC scheme represents a data transmission scheme for determining different modulation schemes and coding schemes according to channel conditions between a cell, i.e., BS, and an MS, thereby improving the efficiency of the cell. The AMC scheme has a plurality of modulation schemes and a plurality of coding schemes, and modulates and codes channel signals using the most preferred combination of the modulation schemes and the coding schemes. Each of the combinations of the modulation schemes and the coding schemes is called Modulation and Coding Scheme (MCS), and MCS level 1 through MCS level N can be defined according to the number of the possible MCSs. That is, the AMC scheme adaptively determines an MCS level according to the channel conditions between a BS and an MS currently connected to the BS, thereby improving the full efficiency of the BS system.

In the IEEE 802.16e communication system, in order to use various schemes for high-speed data transmission such as the AMC scheme, an MS must feed back channel state information, i.e., channel quality information (CQI), of a downlink to its BS, i.e., serving BS. With reference to FIG. 2, a description will now be made of a CQI channel configuration for feeding back the CQI to the BS in the IEEE 802.16e communication system.

FIG. 2 is a diagram schematically illustrating a CQI channel configuration for a general IEEE 802.16e communication system.

Before a description of FIG. 2 is given, it should be noted that in the IEEE 802.16e communication system, one CQI channel can include a predetermined number of tiles, for example, 6 tiles. Each tile can include a predetermined number of adjacent data sub-carriers (or sub-carrier bands) for a period of a predetermined number of OFDM symbols. Referring to FIG. 2, when the IEEE 802.16e communication system uses an Optional Partial Usage of Sub-Channels (O-PUSC) scheme, one tile 200 may include eight adjacent data sub-carriers and one pilot sub-carrier for a 3-OFDM symbol period.

Unlike this, when the IEEE 802.16e communication system uses a Partial Usage of Sub-Channels (PUSC) scheme, one tile 250 may include eight adjacent data sub-carriers and four pilot sub-carriers for a 3-OFDM symbol period. With reference to FIG. 3, a description will now be made of a tile format for the O-PUSC scheme and a tile format for the PUSC scheme.

FIG. 3 is a diagram schematically illustrating a tile format for the O-PUSC scheme and a tile format for the PUSC scheme.

Referring to FIG. 3, as described above in connection with FIG. 2, a tile 200 for the O-PUSC scheme and a tile 250 for the PUSC scheme can each include a total of eight data sub-carriers $M_{n,8m}$ through $M_{n,8m+7}$ for a 3-OFDM symbol period. Herein, n denotes a CQI channel index and m denotes a tile index. Therefore, $M_{n,8m}$ through $M_{n,8+7}$ represent eight data sub-carriers constituting an $m^{th}$ tile of an $n^{th}$ CQI channel. In addition, as described in connection with FIG. 2, the tile 200 for the O-PUSC scheme includes one pilot sub-carrier and the tile 250 for the PUSC scheme includes four pilot sub-carriers.

Next, a description will be made of an operation of transmitting CQI from an MS to a BS over a CQI channel in the IEEE 802.16e communication system.

A BS may transmit, to an MS, information (e.g., a CQI channel index) on a CQI channel allocated to the MS through a CQI channel allocation message. Upon receiving the CQI channel allocation message, the MS may detect an index of the CQI channel allocated thereto, generate its downlink CQI with a predetermined number of, for example, 6 bits, and feed back the generated CQI to the BS over the allocated CQI channel. A description will now be made of an operation of feeding back of the CQI from the MS to the BS over the CQI channel.

A Quadrature Phase Shift Keying (QPSK) signal that the MS must transmit through each of data sub-carriers constituting each tile of the CQI channel according the generated CQI may be generated through the following two steps.

A first step determines a modulation vector sequence that is mapped to the 6-bit CQI on an one-to-one basis (i.e., each CQI bit value is mapped to an individual modulation vector sequence).

That is, the first step determines modulation vector sequences that are individually mapped to 6 possible bits for generation of the CQI, and the modulation vector sequences individually mapped to the 6 possible bits for generation of the CQI are shown in Table 1A through Table 1D.

TABLE 1A

| 6 bit CQI | Modulation vector sequence (tile #0), (tile #1), (tile #2), (tile #3), (tile #4), (tile #5) |
|---|---|
| 0b000000 | 0, 0, 0, 0, 0, 0 |
| 0b000001 | 1, 1, 1, 1, 1, 1 |
| 0b000010 | 2, 2, 2, 2, 2, 2 |
| 0b000011 | 3, 3, 3, 3, 3, 3 |
| 0b000100 | 4, 4, 4, 4, 4, 4 |
| 0b000101 | 5, 5, 5, 5, 5, 5 |
| 0b000110 | 6, 6, 6, 6, 6, 6 |
| 0b000111 | 7, 7, 7, 7, 7, 7 |
| 0b001000 | 2, 4, 3, 6, 7, 5 |
| 0b001001 | 3, 5, 2, 7, 6, 4 |
| 0b001010 | 0, 6, 1, 4, 5, 7 |
| 0b001011 | 1, 7, 0, 5, 4, 6 |
| 0b001100 | 6, 0, 7, 2, 3, 1 |
| 0b001101 | 7, 1, 6, 3, 2, 0 |
| 0b001110 | 4, 2, 5, 0, 1, 3 |
| 0b001111 | 5, 3, 4, 1, 0, 2 |

TABLE 1B

| 6 bit CQI | Modulation vector sequence (tile #0), (tile #1), (tile #2), (tile #3), (tile #4), (tile #5) |
|---|---|
| 0b010000 | 4, 3, 6, 7, 5, 1 |
| 0b010001 | 5, 2, 7, 6, 4, 0 |
| 0b010010 | 6, 1, 4, 5, 7, 3 |
| 0b010011 | 7, 0, 5, 4, 6, 2 |
| 0b010100 | 0, 7, 2, 3, 1, 5 |
| 0b010101 | 1, 6, 3, 2, 0, 4 |
| 0b010110 | 2, 5, 0, 1, 3, 7 |
| 0b010111 | 3, 4, 1, 0, 2, 6 |
| 0b011000 | 3, 6, 7, 5, 1, 2 |
| 0b011001 | 2, 7, 6, 4, 0, 3 |
| 0b011010 | 1, 4, 5, 7, 3, 0 |
| 0b011011 | 0, 5, 4, 6, 2, 1 |
| 0b011100 | 7, 2, 3, 1, 5, 6 |
| 0b011101 | 6, 3, 2, 0, 4, 7 |
| 0b011110 | 5, 0, 1, 3, 7, 4 |
| 0b011111 | 4, 1, 0, 2, 6, 5 |

TABLE 1C

| 6 bit CQI | Modulation vector sequence (tile #0), (tile #1), (tile #2), (tile #3), (tile #4), (tile #5) |
|---|---|
| 0b100000 | 6, 7, 5, 1, 2, 4 |
| 0b100001 | 7, 6, 4, 0, 3, 5 |
| 0b100010 | 4, 5, 7, 3, 0, 6 |
| 0b100011 | 5, 4, 6, 2, 1, 7 |
| 0b100100 | 2, 3, 1, 5, 6, 0 |
| 0b100101 | 3, 2, 0, 4, 7, 1 |
| 0b100110 | 0, 1, 3, 7, 4, 2 |
| 0b100111 | 1, 0, 2, 6, 5, 3 |
| 0b101000 | 7, 5, 1, 2, 4, 3 |
| 0b101001 | 6, 4, 0, 3, 5, 2 |
| 0b101010 | 5, 7, 3, 0, 6, 1 |
| 0b101011 | 4, 6, 2, 1, 7, 0 |
| 0b101100 | 3, 1, 5, 6, 0, 7 |
| 0b101101 | 2, 0, 4, 7, 1, 6 |
| 0b101110 | 1, 3, 7, 4, 2, 5 |
| 0b101111 | 0, 2, 6, 5, 3, 4 |

TABLE 1D

| 6 bit CQI | Modulation vector sequence (tile #0), (tile #1), (tile #2), (tile #3), (tile #4), (tile #5) |
|---|---|
| 0b110000 | 5, 1, 2, 4, 3, 6 |
| 0b110001 | 4, 0, 3, 5, 2, 7 |
| 0b110010 | 7, 3, 0, 6, 1, 4 |
| 0b110011 | 6, 2, 1, 7, 0, 5 |
| 0b110100 | 1, 5, 6, 0, 7, 2 |
| 0b110101 | 0, 4, 7, 1, 6, 3 |
| 0b110110 | 3, 7, 4, 2, 5, 0 |
| 0b110111 | 2, 6, 5, 3, 4, 1 |
| 0b111000 | 1, 2, 4, 3, 6, 7 |
| 0b111001 | 0, 3, 5, 2, 7, 6 |
| 0b111010 | 3, 0, 6, 1, 4, 5 |
| 0b111011 | 2, 1, 7, 0, 5, 4 |
| 0b111100 | 5, 6, 0, 7, 2, 3 |
| 0b111101 | 4, 7, 1, 6, 3, 2 |
| 0b111110 | 7, 4, 2, 5, 0, 1 |
| 0b111111 | 6, 5, 3, 4, 1, 0 |

The modulation vector sequences individually mapped to the 6 possible bits for generation of the CQI on an one-to-one basis (i.e., each CQI bit value/combination is mapped to an individual modulation vector sequence) are determined as shown in Table 1A through Table 1D. For example, for a 6-bit CQI of 0b 001001, modulation vector sequences for representing the 6-bit CQI of 0b 001001 become {3,5,2,7,6,4}. Herein, the modulation vector sequences {3,5,2,7,6,4} mean that they are mapped to 6 tiles constituting the CQI channel on an one-to-one basis such that a modulation vector #3 is mapped to a tile #0, a modulation vector #5 is mapped to a tile #1, a modulation vector #2 is mapped to a tile #2, a modulation vector #7 is mapped to a tile #3, a modulation vector #6 is mapped to a tile #4, and a modulation vector #4 is mapped to a tile #5.

A second step, after determining a modulation vector sequence that is mapped to the 6-bit CQI on an one-to-one basis, determines a QPSK sequence mapped to each of the modulation vectors constituting the modulation vector sequence.

That is, the second step determines QPSK sequences mapped to the modulation vectors on an one-to-one basis (i.e., each modulation vector is mapped to an individual QPSK sequence), and the QPSK sequences individually mapped to the modulation vectors are shown in Table 2.

TABLE 2

| Modulation vector | QPSK sequence |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

As shown in Table 2, each modulation vector is mapped to a length=8 QPSK sequence on an one-to-one basis (i.e., each modulation vector is mapped to an individual QPSK sequence), and elements constituting the QPSK sequence are mapped to eight data sub-carriers of each of the tiles constituting a CQI channel on an one-to-one basis (i.e., each one of the QPSK sequence is mapped to an individual data sub-carrier). For example, if a modulation vector to be transmitted over a particular tile is modulation vector #0, eight data sub-carriers constituting the particular tile sequentially transmit P0, P1, P2, P3, P0, P1, P2, and P3, respectively. That is, if the particular tile is an $m^{th}$ tile of an $n^{th}$ CQI channel, $M_{n,8m}$ among eight data sub-carriers constituting the $m^{th}$ tile transmits P0, $M_{n,8m+1}$ transmits P1, $M_{n,8m+2}$ transmits P2, and $M_{n,8m+3}$ transmits P3, $M_{n,8m+4}$ transmits P0, $M_{n,8m+5}$ transmits P1, $M_{n,8m+6}$ transmits P2, and $M_{n,8m+7}$ transmits P3, to thus map each one of the QPSK sequence to an individual data sub-carrier. The elements P0 through P3 constituting the QPSK sequence can be expressed as Equation (1) below, representing a constellation of a QPSK signal.

$$P0 = \exp\left(j \cdot \frac{\pi}{4}\right)$$
$$P1 = \exp\left(j \cdot \frac{3\pi}{4}\right)$$
$$P2 = \exp\left(-j \cdot \frac{3\pi}{4}\right)$$
$$P3 = \exp\left(-j \cdot \frac{\pi}{4}\right)$$
(1)

The modulation vector sequences and the QPSK sequences constituting each of the modulation vector sequences are predefined between the BS and the MS and transmission from the BS to the MS of information as to the modulation vector sequence is not necessary. As described above, the MS can transmit the QPSK signal generated through the two steps to the BS over a CQI channel, and the BS can receive the CQI channel signal transmitted by the MS and detect the CQI transmitted by the MS by performing correlation between the modulation vector sequences and the QPSK sequences constituting each of the modulation vector sequences.

However, the CQI transmission/reception scheme described above may not consider CQI reception performance of the communication system, the number of reception antennas of a receiver, an increase in gain of reception power of the receiver, and/or inefficient use/waste of CQI channel resources. Although the IEEE 802.16e communication system was discussed in detail above, the foregoing deficiencies may also arise in other communication systems including but not limited to CDMA and TDMA systems. Accordingly, there is a demand for an improved CQI communication scheme applicable in various communication systems.

SUMMARY OF THE INVENTION

In transmitting channel quality information (CQI) by a mobile station (MS) in a communication system, the mobile station receives from a base station (BS) information of an allocation of a CQI channel and information as to a modulation to be performed on the CQI. CQI channel signal is generated based on the CQI and the modulation information, where the CQI corresponds to a measured channel state. The CQI channel signal is transmitted to the BS over the allocated CQI channel.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENT

Figure 1:
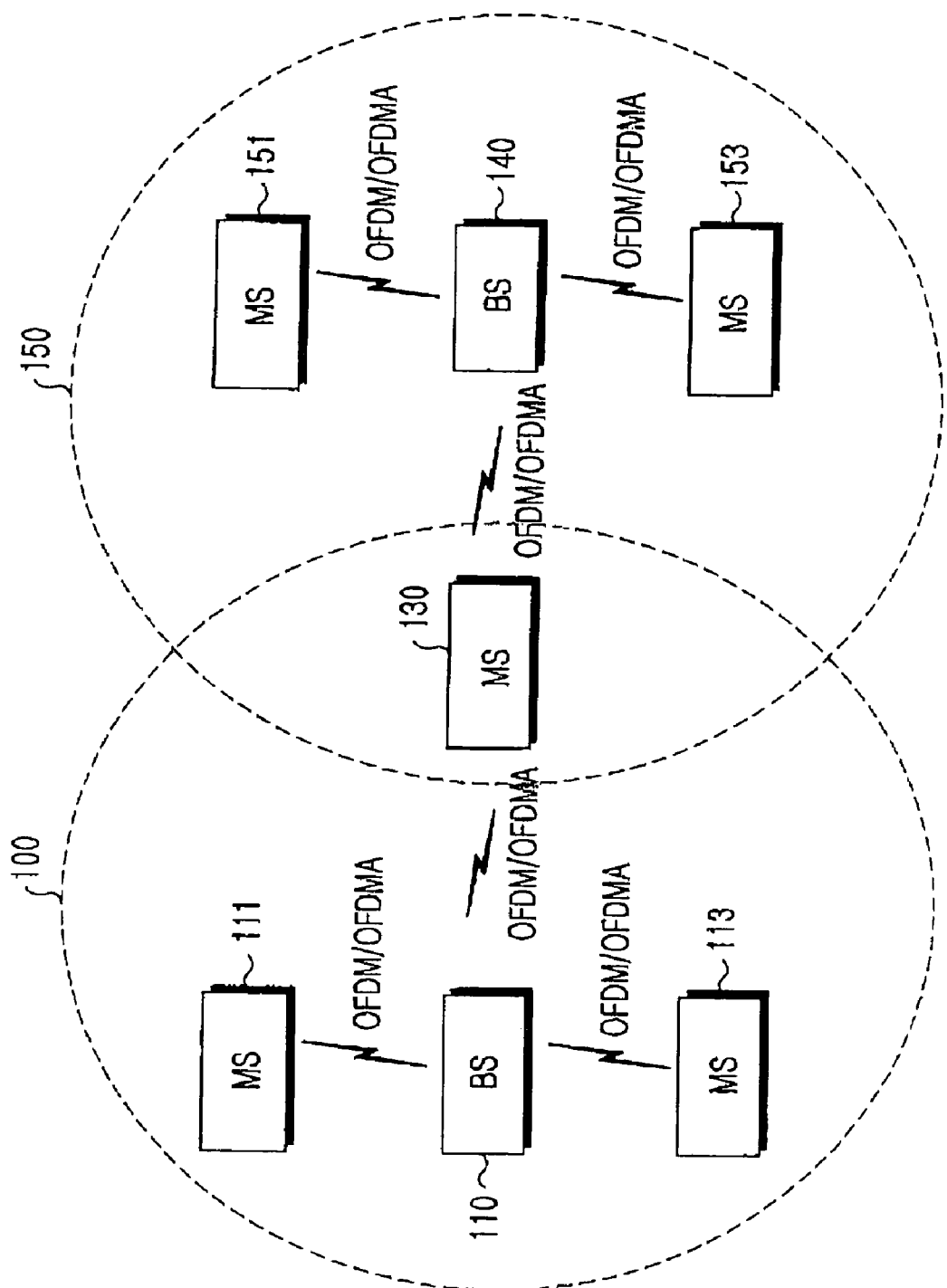
FIG. 1 is a diagram schematically illustrating a configuration of a conventional IEEE 802.16e communication system.

An exemplary embodiment of the present invention will now be described in detail with reference to the annexed drawings. In the drawings, the same or similar elements are denoted by the same reference numerals even though they may depicted in different drawings. In the following description, a detailed description of known functions and configurations incorporated herein has been omitted for clarity and conciseness.

The present invention proposes a scheme for transmitting/receiving channel state information, i.e., channel quality information (CQI), of a downlink according to the number of reception antennas of a receiver, i.e., a base station (BS), in a communication system. Although the communication system is illustrated with a system using an Orthogonal Frequency Division Multiple Access (OFDMA) scheme (hereinafter referred to as an "OFDMA communication system"), the present invention may also be applied to other communication systems including but not limited to CDMA and TDMA systems. According to an exemplary embodiment, the present invention may use a scheme for transmitting/receiving CQI with 6 bits for indicating/expressing the downlink channel state of a mobile station (MS), taking into consideration the number of reception antennas of the BS, and/or generating modulation vector sequences used for transmitting the 6-bit CQI.

Figure 2:
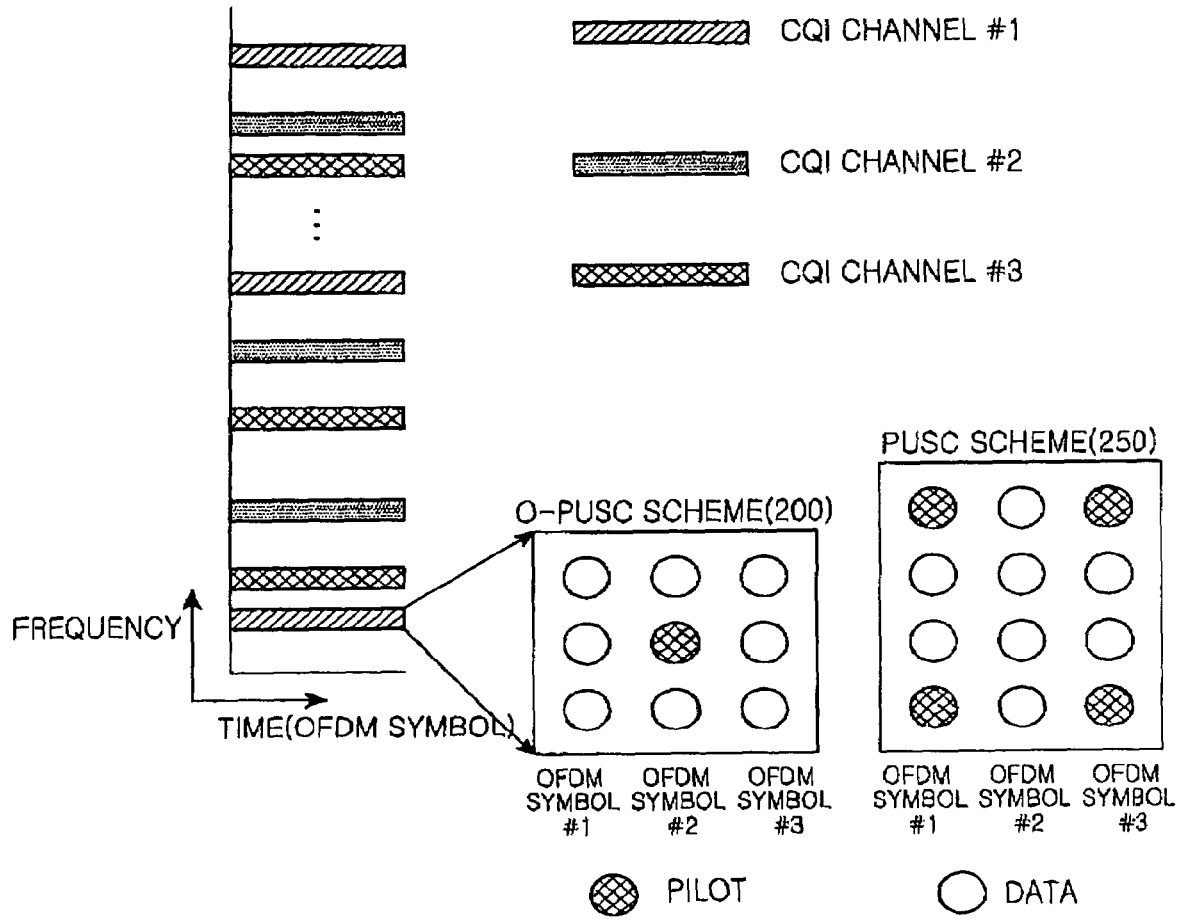
FIG. 2 is a diagram schematically illustrating a CQI channel configuration for a conventional IEEE 802.16e communication system.
Figure 3:
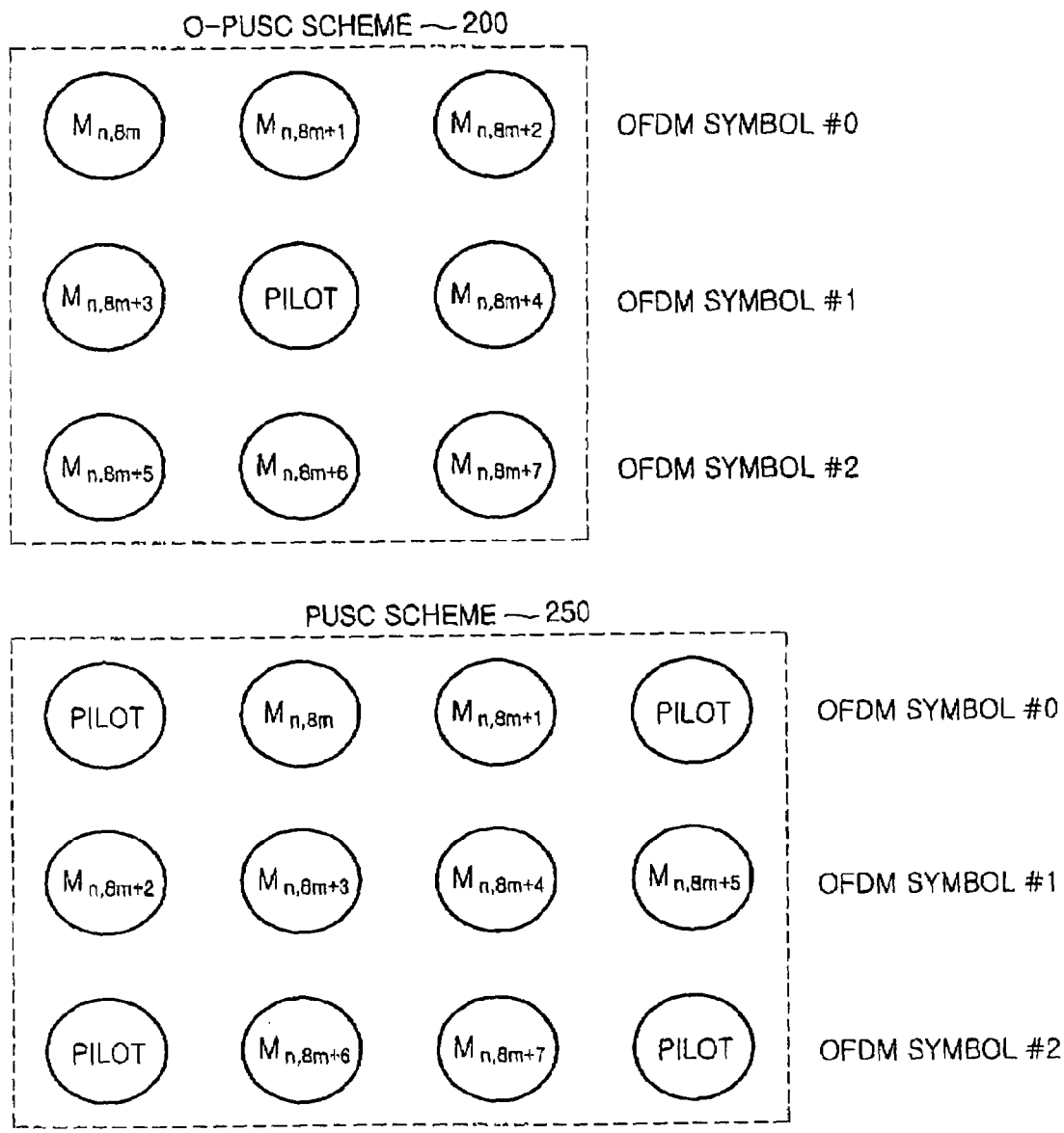
FIG. 3 is a diagram schematically illustrating a tile format for an O-PUSC scheme and a tile format for a PUSC scheme for a conventional IEEE 802.16e communication system.

For convenience, the OFDMA communication system according to an exemplary embodiment of the present invention is illustrated based on an Institute of Electrical and Electronics Engineers (IEEE) 802.16e communication system. The CQI channel according to an exemplary embodiment of the present invention may have the configuration described with reference to FIGS. 2 and 3.

Before a description of exemplary embodiments of the present invention is given, a description will be made of signal reception performance for the case where a BS has a plurality of reception antennas.

In the current IEEE 802.16e communication system, in order to allow an MS to feed back CQI to a BS, the BS may allocate one dedicated CQI channel to every MS. The MS can feed back CQI corresponding to its own downlink channel state to the BS over the allocated dedicated CQI channel.

However, because the BS, if using a plurality of reception antennas, receives a signal transmitted by the MS through the plurality of reception antennas and demodulates the received signal, can acquire diversity gain, contributing to a reduction in level of reception power required in demodulating the signal transmitted by the MS without error. That is, because if the BS uses a plurality of reception antennas, a signal-tonoise ratio (SNR) for each individual reception antenna, satisfying required reception performance of CQI from the MS, may decrease in proportion to the number of the reception antennas. When the BS uses a plurality of reception antennas in this way, gain of reception power increases such that a plurality of different MSs can simultaneously transmit CQIs over one CQI channel. Therefore, according to an exemplary embodiment, the present invention may increase efficiency of frequency resources by proposing a scheme in which a BS using a plurality of reception antennas allows a plurality of MSs, for example two MSs, to share one CQI channel.

Figure 4:
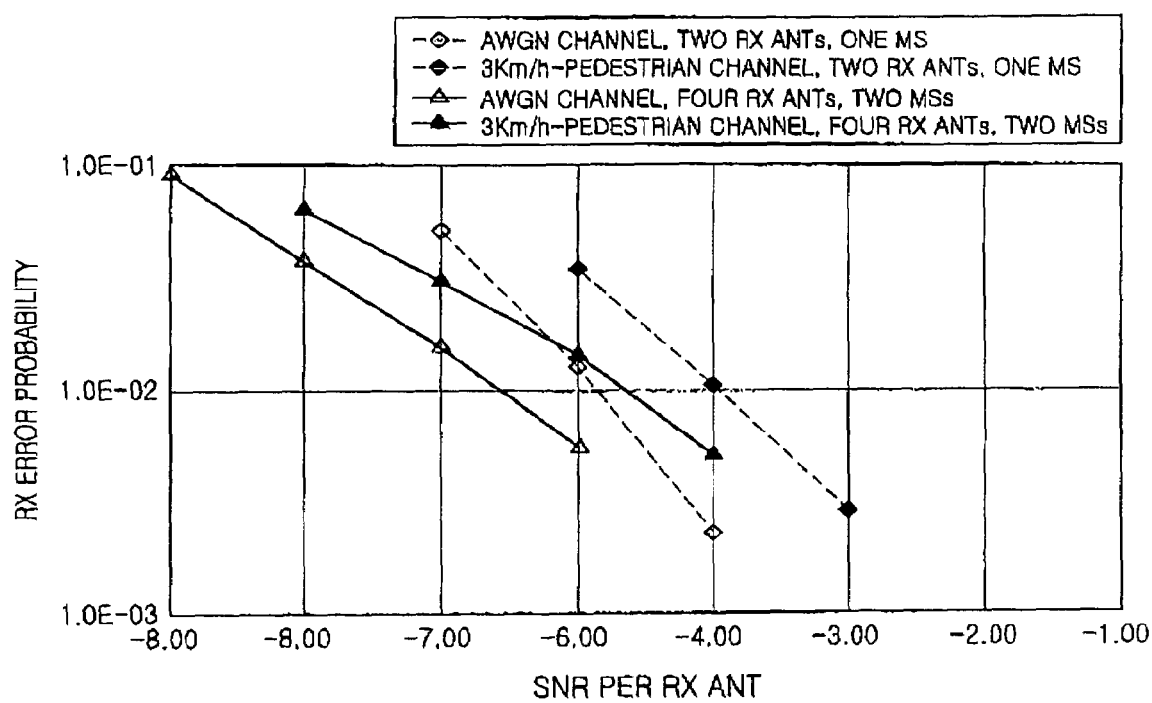
FIG. 4 is a graph illustrating CQI reception performance depending on the number of MSs sharing one CQI channel for the case where a BS uses a plurality of reception antennas according to an exemplary embodiment of the present invention.

With reference to FIG. 4, a description will now be made of CQI reception performance depending on the number of MSs sharing one CQI channel for the case where a BS uses a plurality of reception antennas in, for example, the IEEE 802.16e communication system.

FIG. 4 is a graph illustrating CQI reception performance depending on the number of MSs sharing one CQI channel for the case where a BS uses a plurality of reception antennas in, for example, the IEEE 802.16e communication system according to an exemplary embodiment of the present invention.

FIG. 4 illustrates CQI reception performance for the case where one MS exclusively uses one CQI channel in an additive white Gaussian noise (AWGN) channel environment and a 3 Km/h-pedestrian/moving channel environment when the number of reception antennas of a BS is 2, and CQI reception performance for the case where two MSs share one CQI channel in the AWGN channel environment and the 3 Km/h-pedestrian channel environment when the number of reception antennas of the BS is 4.

For example, assuming that a target reception error probability is 0.01 when the number of reception antennas of the BS is 2, if an SNR per reception antenna is −4.0 [dB] when one MS exclusively uses one CQI channel in the 3 Km/h-pedestrian channel environment, the reception error probability 0.01 is satisfied. When the number of reception antennas of the BS is 4, even though an SNR per reception antenna is lower than −4.0 [dB] and two MSs share one CQI channel in the 3 Km/h-pedestrian channel environment, the reception error probability 0.01 can be satisfied.

As a result, the increase in number of reception antennas of the BS may increase CQI reception performance, making it possible to allow a plurality of MSs to share one CQI channel. Therefore, according to an exemplary embodiment of the present invention, a BS, using a plurality of reception antennas, may allow a plurality of MSs to share one CQI channel. For example the number of MSs sharing one CQI channel may be 2. The increase in number of reception antennas of the BS can increase the CQI reception performance, and the increase in the CQI reception performance can contribute to an increase in number of MSs sharing one CQI channel.

As described in the prior art section, in order to feed back CQI by measuring its downlink channel state, an MS may generate a QPSK signal and transmit it through each of data sub-carriers constituting each tile of a CQI channel. Assuming herein that the CQI may be generated with, for example, 6 bits, according to an exemplary embodiment, the present invention may determine a modulation vector sequence mapped to the 6-bit CQI on an one-to-one basis and thereafter, determine a QPSK sequence for each of the modulation vectors constituting the modulation vector sequence.

First, the MS may determine modulation vector sequences that are individually mapped to 6 possible bits for generation of the CQI on an one-to-one basis (i.e., each CQI bit value/combination is mapped to an individual modulation vector sequence), and if two MSs share one CQI channel, an exemplary embodiment of the present invention may require other modulation vector sequences which are different from the modulation vector sequences used when one MS exclusively uses one CQI channel. Therefore, if two MSs would share one CQI channel, an exemplary embodiment of the present invention may use other modulation vector sequences in addition to the modulation vector sequences defined in Tables 1A through Table 1D in the prior art section. Assuming that MSs sharing one CQI channel are MS#1 and MS#2, the MS#1 may generate 6-bit CQI and may transmit a CQI channel signal of the 6-bit CQI according to the modulation vector sequences defined in Table 1A through Table 1D, and the MS#2 may generate 6-bit CQI and transmit the 6-bit CQI according to the modulation vector sequences.

The newly proposed modulation vector sequences individually mapped to the 6 possible bits for generation of the CQI are shown in Table 3A through Table 3D.

TABLE 3A

| 6 bit CQI | Modulation vector sequence (tile #0), (tile #1), (tile #2), (tile #3), (tile #4), (tile #5) |
|---|---|
| 0b000000 | 4, 6, 5, 2, 3, 1 |
| 0b000001 | 5, 7, 4, 3, 2, 0 |
| 0b000010 | 6, 4, 7, 0, 1, 3 |
| 0b000011 | 7, 5, 6, 1, 0, 2 |
| 0b000100 | 0, 2, 1, 6, 7, 5 |
| 0b000101 | 1, 3, 0, 7, 6, 4 |
| 0b000110 | 2, 0, 3, 4, 5, 7 |
| 0b000111 | 3, 1, 2, 5, 4, 6 |
| 0b001000 | 6, 2, 6, 4, 4, 4 |
| 0b001001 | 7, 3, 7, 5, 5, 5 |
| 0b001010 | 4, 0, 4, 6, 6, 6 |
| 0b001011 | 5, 1, 5, 7, 7, 7 |
| 0b001100 | 2, 6, 2, 0, 0, 0 |
| 0b001101 | 3, 7, 3, 1, 1, 1 |
| 0b001110 | 0, 4, 0, 2, 2, 2 |
| 0b001111 | 1, 5, 1, 3, 3, 3 |

TABLE 3B

| 6 bit CQI | Modulation vector sequence (tile #0), (tile #1), (tile #2), (tile #3), (tile #4), (tile #5) |
|---|---|
| 0b010000 | 0, 5, 3, 5, 6, 0 |
| 0b010001 | 1, 4, 2, 4, 7, 1 |
| 0b010010 | 2, 7, 1, 7, 4, 2 |
| 0b010011 | 3, 6, 0, 6, 5, 3 |
| 0b010100 | 4, 1, 7, 1, 2, 4 |
| 0b010101 | 5, 0, 6, 0, 3, 5 |
| 0b010110 | 6, 3, 5, 3, 0, 6 |
| 0b010111 | 7, 2, 4, 2, 1, 7 |
| 0b011000 | 7, 0, 2, 7, 2, 3 |
| 0b011001 | 6, 1, 3, 6, 3, 2 |
| 0b011010 | 5, 2, 0, 5, 0, 1 |
| 0b011011 | 4, 3, 1, 4, 1, 0 |
| 0b011100 | 3, 4, 6, 3, 6, 7 |
| 0b011101 | 2, 5, 7, 2, 7, 6 |
| 0b011110 | 1, 6, 4, 1, 4, 5 |
| 0b011111 | 0, 7, 5, 0, 5, 4 |

TABLE 3C

| 6 bit CQI | Modulation vector sequence (tile #0), (tile #1), (tile #2), (tile #3), (tile #4), (tile #5) |
|---|---|
| 0b100000 | 2, 1, 0, 3, 1, 5 |
| 0b100001 | 3, 0, 1, 2, 0, 4 |
| 0b100010 | 0, 3, 2, 1, 3, 7 |
| 0b100011 | 1, 2, 3, 0, 2, 6 |
| 0b100100 | 6, 5, 4, 7, 5, 1 |
| 0b100101 | 7, 4, 5, 6, 4, 0 |

TABLE 3C-continued

| 6 bit CQI | Modulation vector sequence (tile #0), (tile #1), (tile #2), (tile #3), (tile #4), (tile #5) |
|---|---|
| 0b100110 | 4, 7, 6, 5, 7, 3 |
| 0b100111 | 5, 6, 7, 4, 6, 2 |
| 0b101000 | 3, 3, 4, 0, 7, 2 |
| 0b101001 | 2, 2, 5, 1, 6, 3 |
| 0b101010 | 1, 1, 6, 2, 5, 0 |
| 0b101011 | 0, 0, 7, 3, 4, 1 |
| 0b101100 | 7, 7, 0, 4, 3, 6 |
| 0b101101 | 6, 6, 1, 5, 2, 7 |
| 0b101110 | 5, 5, 2, 6, 1, 4 |
| 0b101111 | 4, 4, 3, 7, 0, 5 |

TABLE 3D

| 6 bit CQI | Modulation vector sequence (tile #0), (tile #1), (tile #2), (tile #3), (tile #4), (tile #5) |
|---|---|
| 0b110000 | 1, 7, 7, 6, 0, 7 |
| 0b110001 | 0, 6, 6, 7, 1, 6 |
| 0b110010 | 3, 5, 5, 4, 2, 5 |
| 0b110011 | 2, 4, 4, 5, 3, 4 |
| 0b110100 | 5, 3, 3, 2, 4, 3 |
| 0b110101 | 4, 2, 2, 3, 5, 2 |
| 0b110110 | 7, 1, 1, 0, 6, 1 |
| 0b110111 | 6, 0, 0, 1, 7, 0 |
| 0b111000 | 5, 4, 1, 1, 5, 6 |
| 0b111001 | 4, 5, 0, 0, 4, 7 |
| 0b111010 | 7, 6, 3, 3, 7, 4 |
| 0b111011 | 6, 7, 2, 2, 6, 5 |
| 0b111100 | 1, 0, 5, 5, 1, 2 |
| 0b111101 | 0, 1, 4, 4, 0, 3 |
| 0b111110 | 3, 2, 7, 7, 3, 0 |
| 0b111111 | 2, 3, 6, 6, 2, 1 |

The modulation vector sequences individually mapped to the 6 possible bit combinations for generation of the CQI may be determined as shown in Table 3A through Table 3D. For example, for a 6-bit CQI of 0b 001010, modulation vector sequences for representing the 6-bit CQI of 0b 001010 may become {4,0,4,6,6,6}. Herein, the modulation vector sequence {4,0,4,6,6,6} means that the modulation vectors may be mapped to 6 tiles constituting the CQI channel on an one-to-one basis such that a modulation vector #4 is mapped to a tile #0, a modulation vector #0 is mapped to a tile #1, a modulation vector #4 is mapped to a tile #2, a modulation vector #6 is mapped to a tile #3, a modulation vector #6 is mapped to a tile #4, and a modulation vector #6 is mapped to a tile #5.

As an illustrative example, it will be assumed herein that a set of the modulation vector sequences defined in Table 1A through Table 1D is a modulation vector sequence set $S_0$, and a set of the modulation vector sequences defined in Table 3A through Table 3D is a modulation vector sequence set $S_1$. In addition, correlation performance during reception of the modulation vector sequences may be optimized by keeping the minimum Hamming distance of 5 between the modulation vector sequences defined in Table 3A through Table 3D. Because two MSs may share one CQI channel, a sufficiently large minimum Hamming distance may be set between the modulation vector sequences belonging to the modulation vector sequence set $S_0$ and the modulation vector sequences belonging to the modulation vector sequence set $S_1$, and the modulation vector sequences defined in Table 3A through Table 3D may maintain the minimum Hamming distance of 4 with the modulation vector sequences defined in Table 1A through Table 1D. In this example, the minimum Hamming distance of 4 is because it is theoretically impossible to design more than 64 modulation vector sequences such that the minimum Hamming distance of 4 or larger is provided between them.

In addition, because the minimum Hamming distance between the modulation vector sequences belonging to the modulation vector sequence set $S_0$ and the modulation vector sequences belonging to the modulation vector sequence set $S_1$ is 4, the possible performance deterioration, compared with that of the minimum Hamming distance of 5 for example, may be made up for by the improvement of CQI reception performance depending on the number of reception antennas, described with reference to FIG. 4.

Therefore, an exemplary embodiment of the present invention may use Reed-Solomon codes in order to keep the minimum Hamming distance of 4 between the modulation vector sequences belonging to the modulation vector sequence set $S_0$ and the modulation vector sequences belonging to the modulation vector sequence set $S_1$. A description will now be made of an exemplary scheme for generating the modulation vector sequences belonging to the modulation vector sequence set $S_1$ using the Reed-Solomon codes.

Because the number of types of modulation vectors to be individually transmitted through the 6 tiles constituting the CQI channel may be 8, a Galois field $GF(2^3)$ having 8 elements may be defined in order to independently map the 8 elements to the 8 modulation vectors on an one-to-one basis. Herein, GF(Q) has Q elements {0,1,2, ... , Q−1}, where Q denotes a size of the Galois field, and addition and multiplication in GF(Q), where Q is a decimal, may be defined as Equation (2) below.

$$a+b=(a+b) \mod Q, \text{ for } a,b \in 0,1,2, \ldots, Q-1$$

$$a*b=(a*b) \mod Q, \text{ for } a,b \in 0,1,2, \ldots, Q-1 \qquad (2)$$

In addition, an exemplary embodiment of the present invention may determine a third-degree primitive polynomial $x^3+x+1$ required for a definition of the $GF(2^3)$, and determine a primitive element a satisfying a condition of $\alpha^3 \alpha+1$, $\alpha^{8-1}=\alpha^7=1, \alpha^k \neq 1, k<7$, among the 8 elements belonging to the $GF(2^3)$. Once the primitive element $\alpha$ is determined, all of the elements belonging to the $GF(2^3)$ can be found as shown in Table 4 below.

TABLE 4

| Expression of involution of α | Expression of second degree polynomial | 3-bit binary expression of polynomial coefficient ($\alpha^2 \alpha 1$: modulation vector) |
|---|---|---|
| 0 | 0 | 0b 000 (0) |
| 1 | 1 | 0b 001 (1) |
| α | α | 0b 010 (2) |
| $\alpha^2$ | $\alpha^2$ | 0b 100 (4) |
| $\alpha^3$ | α + 1 | 0b 011 (3) |
| $\alpha^4$ | $\alpha^2 + \alpha$ | 0b 110 (6) |
| $\alpha^5$ | $\alpha^2 + \alpha + 1$ | 0b 111 (7) |
| $\alpha^6$ | $\alpha^2 + 1$ | 0b 101 (5) |

The second-degree polynomials shown in Table 4 finally may have values between 0b 000 and 0b 111 when their polynomial coefficients are expressed as binary numbers, and the binary values between 0b 000 and 0b 111 may be finally converted into decimal numbers and then used for determining the modulation vector sequences shown in Table 3A through Table 3D.

Next, a description will be made of an exemplary operation of generating the modulation vector sequences belonging to the modulation vector sequence set $S_0$.

When the 6-bit CQI is divided into two 3-bit parts, the 6-bit CQI is defined as Equation (3) below.

$$m(x) = m_1 x + m_0 \quad (3)$$

In Equation (3), $m_0$ and $m_1$ denote elements in the $GF(2^3)$, and binary expression for the 3-bit data may be given as shown in Table 4. For example, for 6-bit CQI=0b 000010, $(m_0, m_1) = (0, \alpha)$. Once the first-degree polynomial $m(x)$ representing the CQI, shown in Equation (3), is determined, a code $C(m)$ for generating the modulation vector sequence can be generated using Equation (4) below.

$$C(m) = [m(\alpha), m(\alpha^2), m(\alpha^3), m(\alpha^4), m(\alpha^5), m(\alpha^6)] \quad (4)$$

In Equation (4), $m(\alpha^k)$ denotes a function value acquired by substituting $\alpha^k$ into a value x of the first-degree polynomial $m(x)$, and its examples are as follows:

Example (1)

$m(x) = m_1 x + m_0$: for 0b 000010, $(m_1, m_0) = (0, \alpha)$
$C(m) = [\alpha, \alpha, \alpha, \alpha, \alpha, \alpha] = [222222]$ Example (2)

$m(x) = m_1 x + m_0$: for 0b 001001, $(m_1, m_0) = (1, 1)$
$C(m) = [\alpha + 1, \alpha^2 + 1, \alpha^3 + 1, \alpha^4 + 1, \alpha^5 + 1, \alpha^6 + 1] =$
$[\alpha + 1, \alpha^2 + 1, \alpha, \alpha^2 + \alpha + 1, \alpha^2 + \alpha, \alpha^2] = [352764]$ Example (3)

$m(x) = m_1 x + m_0$: for 0b 010000, $(m_1, m_0) = (\alpha, 0)$
$C(m) = [\alpha^2, \alpha^3, \alpha^4, \alpha^5, \alpha^6, \alpha^7 (=1)] = [436751]$ Next, a description will be made of an exemplary operation of generating the modulation vector sequences belonging to the modulation vector sequence set $S_1$.

After generating the modulation vector sequences belonging to the modulation vector sequence set $S_0$ in the foregoing manner, in order to generate the modulation vector sequences belonging to the modulation vector sequence set $S_1$, an exemplary embodiment of the present invention extends a degree of the polynomial $m(x)$ representing the 6-bit CQI, shown in Equation (3), from the first degree to the second degree as defined in Equation (5) below.

$$m_{2nd}(x) = m_2 x^2 + m_1 x + m_0 \quad (5)$$

In Equation (5), if $m_2$ is set to 0 ($m_2=0$), the polynomial of Equation (5) becomes equal to the polynomial of Equation (3), and the 64 modulation vector sequences belonging to the modulation vector sequence set $S_0$, shown in Table 1A through Table 1D, are generated. Therefore, an exemplary embodiment of the present invention sets the $m_2$ to 1 ($m_2=1$), and thereafter, generates the 64 modulation vector sequences belonging to the modulation vector sequence set $S_1$ using Equation (4). If the $m_2$ is set to 1, Equation (4) is modified into Equation (6) below.

$$C(m) = [m_{2nd}(\alpha), m_{2nd}(\alpha^2), m_{2nd}(\alpha^3), m_{2nd}(\alpha^4), m_{2nd}(\alpha^5), m_{2nd}(\alpha^6)] \quad (6)$$

$= [m(\alpha) + \alpha^2, m(\alpha^2) + \alpha^4, m(\alpha^3) + \alpha^6, m(\alpha^4) + \alpha^8,$ $m(\alpha^5) + \alpha^{10}, m(\alpha^6) + \alpha^{12}]$ -continued $= [m(\alpha) + \alpha^2, m(\alpha^2) + \alpha^2 + \alpha, m(\alpha^3) + \alpha^2 + 1, m(\alpha^4) + \alpha, m(\alpha^5) +$ $\alpha + 1, m(\alpha^6) + \alpha^2 + \alpha + 1]$ Assuming herein, for example, that the number of MSs sharing one CQI channel is 2, the two modulation vector sequence sets $S_0$ and $S_1$ are required in the exemplary embodiment of the present invention. However, even when the number of MSs sharing one CQI channel exceeds 2, i.e., is greater than or equal to 3, modulation vector sequences independently applied to the more than three MSs can be generated. In this case, by setting the $m_2$ with the remaining elements other than 0 and 1 in the $GF(2^3)$, it is possible to generate additional modulation vector sequence sets $S_2$ through $S_7$.

As described above, an exemplary embodiment of the present invention may differentiate the modulation vector sequences to be independently used by the two MSs sharing one CQI channel by generating the modulation vector sequence sets $S_0$ and $S_1$. Therefore, in an exemplary embodiment of the present invention, a BS may provide each of two MSs sharing one CQI channel with the information indicating which of the modulation vector sequence sets each of the MSs may use to transmit the CQI. For example, the BS can transmit the information using a CQI channel allocation message currently used in the IEEE 802.16e communication system. An exemplary format of the CQI channel allocation message including the information indicating which of the modulation vector sequence sets each of the MSs may use to transmit the CQI is shown in Table 5 below.

TABLE 5

| Syntax | Size (bits) | Meaning |
|---|---|---|
| CQICH_Enhanced_Alloc_IE( ){ | | |
| Extended DIUC | 4 | Indicator for identifying CQICH allocation message |
| Length | 4 | Full length of CQICH allocation message (in bytes) |
| CQICH_ID | variable | MS management number for management of MS that is allocated CQICH |
| Period(=p) | 2 | CQICH transmission period in $2^p$-frames |
| Frame offset | 3 | Frame offset up to start of CQICH transmission after receipt of CQICH allocation message |
| Duration(=d) | 3 | A CQI feedback is transmitted on the CQI channels indexed by the CQICH_ID for $10 \times 2^d$ frames. If d = 0, the CQICH is de-allocated. If d = 111, the MS should report until the BS command for the MS to stop. |
| . . . | . . . | . . . |
| Feedback_type | 2 | It means information bits transmitted over CQICH 00 = Fast DL measurement (general CQI) |

TABLE 5-continued

| Syntax | Size (bits) | Meaning |
|---|---|---|
| | | 01 = MIMO Antenna Feedback (per-antenna CQI) 10 = MIMO mode and permutation mode feedback (MIMO transmission mode) 11 = Reserved |
| CQICH_Num | 4 | Number of CQICHs to be allocated to corresponding MS (for MIMO, a plurality of CQICHs are used) |
| for(i=0;i<CQICH_Num;i++){ | | |
| Allocation index | 6 | Sub-channel number for CQICH transmission |
| Codeword set | 1 | Index to randomizer shift offset in Sec. 8.4.5.4.10.10 0 = Use Codeword Set $S_0$ with scrambling shift offset (Default) 1 = Use Codeword Set $S_1$ with 40 scrambling shift offset. |
| } | | |
| ... | ... | ... |

The CQI channel allocation message shown in Table 5 includes a plurality of information elements (IEs), and each of the IEs included in the CQI channel allocation message will be described herein below. It should be noted in Table 5 that the CQI channel is denoted by "CQICH."

An Extended DIUC field may indicate a Downlink Interval Usage Code (DIUC) applied to the CQI channel allocation message, a Length field may indicate a length of the CQI channel allocation message, a CQICH_ID field may indicate an MS management number for managing an MS allocated a corresponding CQI channel, i.e., indicate an identifier (ID) of the CQI channel allocated to the corresponding MS, a Period field indicates a CQI channel transmission period, a Frame offset field may indicate a frame offset up to a time at which actual transmission of the CQI channel starts after receipt of the CQI channel allocation message, a Duration field may indicate duration for which the CQI channel is transmitted, a Feedback_type field may indicate the meaning of information bits transmitted over the CQI channel, and a CQICH_Num field may indicate the number of CQI channels allocated to the corresponding MS. In the exemplary IEEE 802.16e communication system, Multiple-Input Multiple-Output (MIMO) technology may be used and a plurality of CQI channels may be allocated to the MS.

When a BS has a plurality of transmission antennas, the CQICH_Num field may be set to a plural number in order to allow the MS to measure a channel for each of the transmission antennas and then, feed back CQI for each of the transmission antennas by sharing one sub-channel over which the MS may report the CQI for each of the transmission antennas to the BS. In this case also, the MS may feed back the CQI using the modulation vector sequence sets $S_0$ and $S_1$, like in the case where two MSs may share one sub-channel in transmitting the CQI.

The exemplary CQI channel allocation message of Table 5 includes CQICH_Num Allocation index field and Codeword Set field. The Allocation index field indicates a sub-channel index, i.e., sub-channel number, allocated to the CQI channel, and the Codeword Set field, a new field proposed in the present invention, indicates a modulation vector sequence set index and a scrambling shift offset, to be used by the MS. A detailed description of the scrambling shift offset will be made below.

As a result, when, for example, allocating CQI channels to two MSs, the BS with a plurality of reception antennas, for example, may allocate the same sub-channel index, i.e., write the same sub-channel index in the Allocation index field of the exemplary CQI channel allocation message transmitted to each of the two MSs, allocate different modulation vector sequence set indexes and scrambling shift offsets to the two MSs, and then transmit the information to the two MSs through the CQI channel allocation message. Then each of the two MSs may receive the CQI channel allocation message, and transmit the 6-bit CQI to the BS through, for example, the same sub-channel, i.e., the same CQI channel, using the different modulation vector sequences.

Figure 5:
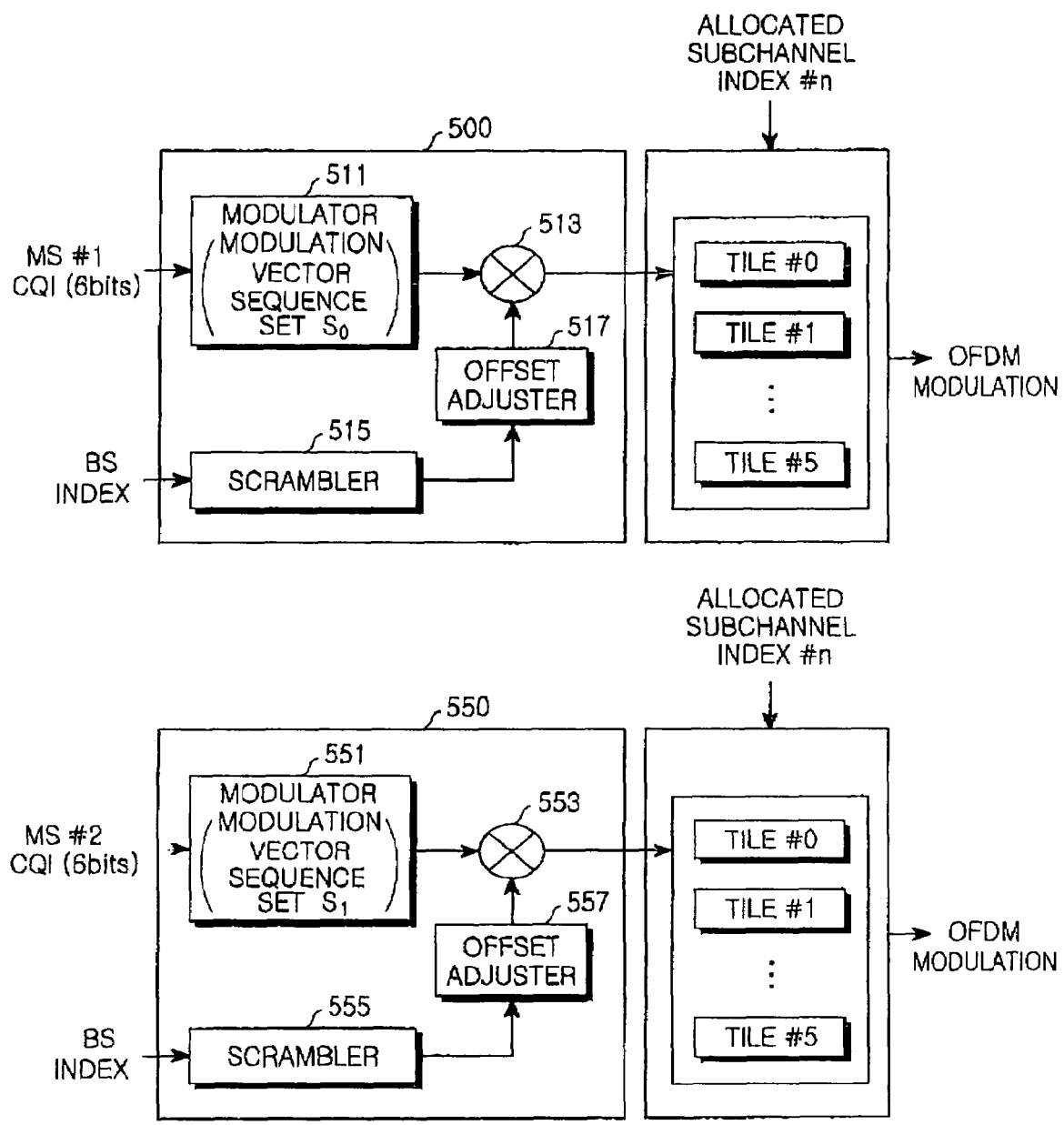
FIG. 5 is a block diagram illustrating an internal structure of a CQI channel transmission apparatus in an MS according to an exemplary embodiment of the present invention.

With reference to FIG. 5, a description will now be made of an exemplary internal structure of a CQI channel transmission apparatus in an MS according to an exemplary embodiment of the present invention.

FIG. 5 is a block diagram illustrating an exemplary internal structure of a CQI channel transmission apparatus in an MS according to an exemplary embodiment of the present invention.

FIG. 5 illustrates an exemplary internal structure of CQI channel transmission apparatuses for two MSs of MS#1 and MS#2, for a comparative description of operations of the two MSs, in which the MSs independently may transmit their CQIs using the same single CQI channel. The CQI channel transmission apparatuses for the MS#1 and the MS#2 may be equal to each other in hardware structure, and different from each other only in modulation vector sequence set and offset applied thereto because they may transmit different CQIs using the same CQI channel.

Referring to FIG. 5, an exemplary CQI channel generator 500 for the MS#1 may include a modulator 511, a multiplier 513, a scrambler 515 and an offset adjuster 517, and a CQI channel generator 550. MS#2 may include a modulator 551, a multiplier 553, a scrambler 555 and an offset adjuster 557.

First, the exemplary CQI channel generator 500 for the MS#1 will be described.

If, for example, 6-bit CQI for the MS#1 is determined, the determined 6-bit CQI may be applied to the modulator 511. The modulator 511 may QPSK-modulate the determined 6-bit CQI using a modulation vector sequence set $S_0$, and output the modulation result to the multiplier 513. Herein, the MS#1 may acquire information on the modulation vector sequence set that it may use, through, for example, the CQI channel allocation message described in connection with Table 5. It will be assumed with respect to FIG. 5 that the MS#1 has been informed by a BS that it may use the modulation vector sequence set $S_0$. Upon receiving a BS index for a BS to which the MS#1 may transmit the CQI, the scrambler 515 may scramble the BS index with a scrambling code corresponding to the BS index, and output the scrambling result to the offset adjuster 517.

The offset adjuster 517 offset-adjusts the signal output from the scrambler 515 by applying a predetermined offset thereto (e.g., the offset indicated in the channel allocation information), and outputs the offset adjustment result to the multiplier 513. The offset adjustment may minimize a correlation between the modulation vector sequence set $S_0$ and the modulation vector sequence set $S_1$. Although a correlation corresponding to, for example, the minimum Hamming distance of 4 may be kept between the modulation vector sequence set $S_0$ and the modulation vector sequence set $S_1$, the offset adjuster 517 may further reduce the correlation by applying different offsets to the modulation vector sequence set $S_0$ and the modulation vector sequence set $S_1$. Herein, the MS#1 acquires information on the offset that it must use, through the CQI channel allocation message described with reference to Table 5.

The multiplier 513 may multiply the signal output from the modulator 511 by the signal output from the offset adjuster 517 to generate a modulated final CQI channel signal, and insert the final CQI channel signal in six tiles, i.e., tile #0 through tile #5, of a sub-channel corresponding to, for example, a sub-channel index n allocated to the MS#1 as a CQI channel. Thereafter, a final stage (not shown) may modulate the tiles by Orthogonal Frequency Division Multiplexing (OFDM), performs radio frequency (RF) processing on the modulated signals, and transmits, via transmitter(s), the RF-processed signals to the BS. Because the unit for performing OFDM modulation and RF processing on the sub-channel is equal to a general unit for processing OFDM modulation and RF processing, it is not separately illustrated in FIG. 5. For example, the transmitters coupled (e.g., indirectly) to the CQI channel generators in FIG. 5 may be any conventionally well known signal transmitters and are not illustrated any further as such.

Second, the exemplary CQI channel generator 550 for the MS#2 will be described.

If 6-bit CQI for the MS#2 is determined, the determined 6-bit CQI may be applied to the modulator 551. The modulator 551 QPSK-modulates the determined 6-bit CQI using a modulation vector sequence set $S_1$, and outputs the modulation result to the multiplier 553. Herein, the MS#2 acquires information on the modulation vector sequence set that it may use, through the CQI channel allocation message described in connection with Table 5, and it will be assumed in FIG. 5 that the MS#2 has been informed by a BS that it may use the modulation vector sequence set $S_1$. Upon receiving a BS index for a BS to which the MS#2 may transmit the CQI, the scrambler 555 may scramble the BS index with a scrambling code corresponding to the BS index, and output the scrambling result to the offset adjuster 557.

The exemplary offset adjuster 557 may offset-adjust the signal output from the scrambler 555 by applying a predetermined offset thereto, and outputs the offset adjustment result to the multiplier 553. The offset adjustment may minimize a correlation between the modulation vector sequence set $S_0$ and the modulation vector sequence set $S_1$. That is, although a correlation corresponding to the minimum Hamming distance of 4 may be kept between the modulation vector sequence set $S_0$ and the modulation vector sequence set $S_1$, the exemplary offset adjuster 557 may further reduce the correlation by applying different offsets to the modulation vector sequence set $S_0$ and the modulation vector sequence set $S_1$. Herein, the MS#2 may acquires information on the offset that it may use, through the CQI channel allocation message described with reference to Table 5.

The exemplary multiplier 553 multiplies the signal output from the modulator 551 by the signal output from the offset adjuster 557 to generate a modulated final CQI channel signal, and inserts the final CQI channel signal in six tiles, i.e., tile #0 through tile #5, of a sub-channel corresponding to, for example, a sub-channel index n allocated to the MS#2 as a CQI channel. Thereafter, a final stage (not shown) modulates the tiles by OFDM, performs RF processing on the modulated signals, and transmits, via transmitter(s), the RF-processed signals to the BS. Because the unit for performing OFDM modulation and RF processing on the sub-channel is equal to a general unit for processing OFDM modulation and RF processing, it is not separately illustrated in FIG. 5. For example, the transmitters coupled (e.g., indirectly) to the CQI channel generators in FIG. 5 may be any conventionally well known signal transmitters and are not illustrated any further as such.

Next, with reference to FIG. 6, a description will be made of an exemplary internal structure of a CQI channel reception apparatus in a BS according to an exemplary embodiment of the present invention.

Figure 6:
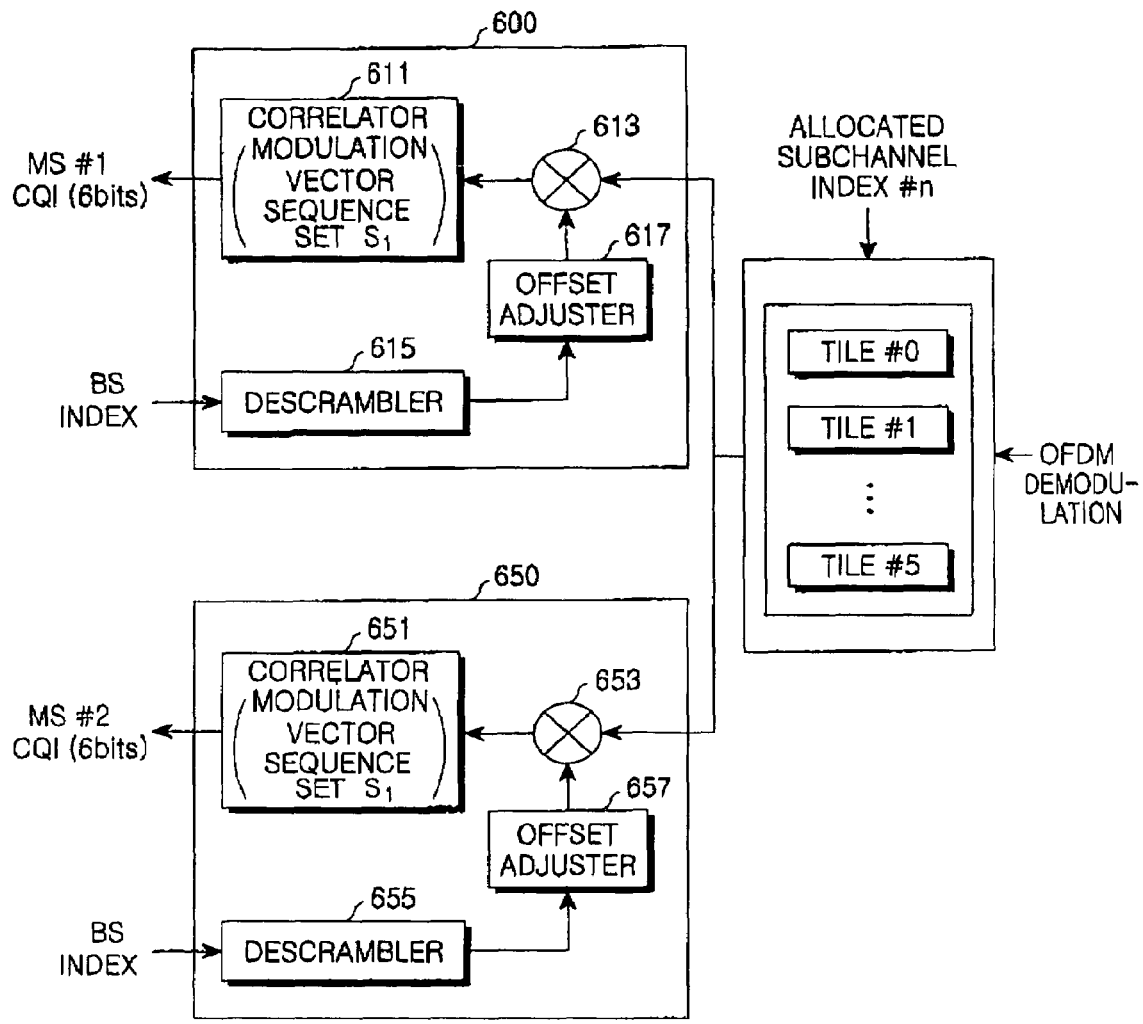
FIG. 6 is a block diagram schematically illustrating an internal structure of a CQI channel reception apparatus in a BS according to an exemplary embodiment of the present invention.

FIG. 6 is a block diagram schematically illustrating an exemplary internal structure of a CQI channel reception apparatus in a BS according to an exemplary embodiment of the present invention.

FIG. 6 illustrates an exemplary internal structure of CQI channel reception apparatuses for two MSs of MS#1 and MS#2, for a comparative description of operations for the two MSs, in which the BS receives CQIs from the two MSs using the same CQI channel. The CQI channel reception apparatuses for the MS#1 and the MS#2 may be equal to each other in hardware structure, and different from each other only in modulation vector sequence set and offset applied thereto if they receive different CQIs using the same CQI channel. For convenience, the BS's CQI channel reception apparatus for receiving a CQI channel transmitted from the MS#1 will be referred to as an "MS#1-CQI channel reception apparatus," and the BS's CQI channel reception apparatus for receiving a CQI channel transmitted from the MS#2 will be referred to as an "MS#2-CQI channel reception apparatus."

Referring to FIG. 6, an MS#1-CQI channel receiver 600 includes a correlator 611, a multiplier 613, a descrambler 615, and an offset adjuster 617, and an MS#2-CQI channel receiver 650 includes a correlator 651, a multiplier 653, a descrambler 655, and an offset adjuster 657.

First, the exemplary MS#1-CQI channel receiver 600 will be described.

The BS may RF-process signals received through a plurality of reception antennas (not shown), demodulate the RF-processed signals by OFDM, and deliver the demodulated signals to the multiplier 613 through six tiles, i.e., tile #0 through tile #5, of a sub-channel corresponding to a sub-channel index n. Because the unit for performing RF processing and OFDM demodulation on the signals received through the plurality of reception antennas is equal to a general unit for processing RF processing and OFDM demodulation, it is not separately illustrated in FIG. 6. For example, receivers coupled (e.g., indirectly) to the CQI channel generators in FIG. 5 may be any conventionally well-known signal receivers and are not illustrated any further as such.

The exemplary descrambler 615 may receive a BS index for its BS, descramble the received BS index with a predetermined scrambling code, and output the descrambling result to the offset adjuster 617. The scrambling code used by the descrambler 615 may be equal to the scrambling code used in the CQI channel transmission apparatus for the MS#1. The offset adjuster 617 may offset-adjust the signal output from the descrambler 615 by applying a predetermined offset thereto, and output the offset adjustment result to the multiplier 613. The offset used by the offset adjuster 617 may be equal to the offset used in the CQI channel transmission apparatus for the MS#1.

The multiplier 613 may multiply signals received through six tiles, i.e., tile #0 through tile #5, of a sub-channel corresponding to the sub-channel index n by the signal output from the offset adjuster 617, and output the multiplication result to the correlator 611. The correlator 611 may perform correlation on the signal output from the multiplier 613 using a predetermined modulation vector sequence set, i.e., a modulation vector sequence vector set $S_0$, and outputs, for example, 6 bits corresponding to a modulation vector sequence having the maximum correlation value as CQI for the MS#1.

Second, the MS#2-CQI channel receiver 650 will be described.

The BS may RF-process signals received through a plurality of reception antennas (not shown), demodulate the RF-processed signals by OFDM, and deliver the demodulated signals to the multiplier 653 through, for example, six tiles, i.e., tile #0 through tile #5, of a sub-channel corresponding to a sub-channel index n. Because the unit for performing RF processing and OFDM demodulation on the signals received through the plurality of reception antennas may be equal to a general unit for processing RF processing and OFDM demodulation, it is not separately illustrated in FIG. 6. For example, the receivers coupled (e.g., indirectly) to the CQI channel generators in FIG. 5 may be any conventionally well known signal receivers and are not illustrated any further as such.

The descrambler 655 may receive a BS index for its BS, descramble the received BS index with a predetermined scrambling code, and output the descrambling result to the offset adjuster 657. The scrambling code used by the descrambler 655 may be equal to the scrambling code used in the CQI channel transmission apparatus for the MS#2. The offset adjuster 657 offset-adjusts the signal output from the descrambler 655 by applying a predetermined offset thereto, and outputs the offset adjustment result to the multiplier 653. The offset used by the offset adjuster 657 may be equal to the offset used in the CQI channel transmission apparatus for the MS#2.

The multiplier 653 multiplies signals received through, for example, six tiles, i.e., tile #0 through tile #5, of a sub-channel corresponding to the sub-channel index n by the signal output from the offset adjuster 657, and outputs the multiplication result to the correlator 651. The correlator 651 performs correlation on the signal output from the multiplier 653 using a predetermined modulation vector sequence set, i.e., a modulation vector sequence vector set $S_1$, and outputs 6 bits corresponding to a modulation vector sequence having the maximum correlation value as CQI for the MS#1.

As can be understood from the foregoing description, in the IEEE 802.16e communication system as an example of the OFDMA communication system, the BS using for example, a plurality of reception antennas may allow a plurality of MSs to share one sub-channel in transmitting their CQIs, thereby contributing to an increase in resource efficiency. In addition, in an exemplary embodiment of the present invention, modulation vector sequences may have the minimum Hamming distance which may prevent a possible reduction in correlation performance occurring when a plurality MSs share one sub-channel in transmitting their CQIs.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for receiving channel quality information (CQI) by a base station in a communication system, the apparatus comprising:
   a transmitter transmitting a CQI channel allocation information and a CQI modulation information to a mobile station (MS);
   a receiver receiving a CQI channel signal from the MS on a CQI channel, the CQI channel being allocated to the MS and the CQI channel signal indicating CQI as measured by the MS; and
   a channel receiver demodulating the CQI based on (i) a correlation performed on the CQI channel signal and (ii) the CQI modulation information;
   wherein the CQI modulation information includes information indicating an allocated modulation vector sequence set among allocable modulation vector sequence sets, each of the allocable modulation vector sequence sets includes modulation vector sequences, each of the modulation vector sequences includes modulation vectors, and information as to an offset to be applied to the allocated modulation vector sequence set;
   wherein the channel receiver demodulates the CQI based on the offset.

2. The apparatus of claim 1, wherein the CQI channel includes a set of tiles, each of the tiles including a same number of adjacent sub-carrier bands for a predetermined time period, the sub-carrier bands being in a communication scheme that divides a full frequency band into a plurality of sub-carrier bands and includes a plurality of sub-channels.

3. The apparatus of claim 1, wherein the allocable modulation vector sequence sets are determined such that a correlation between the modulation vector sequences becomes a predetermined minimum correlation.

4. The apparatus of claim 1, wherein the allocable modulation vector sequence sets are determined such that a minimum Hamming distance between the modulation vector sequences becomes maximized.

5. The apparatus of claim 1, wherein the channel receiver comprises:
   a multiplier multiplying the CQI channel signal by the offset; and
   a correlator correlating a signal outputted from the multiplier to the allocated modulation vector sequence set.

6. The apparatus of claim 1, wherein a number of the allocable modulation vector sequence sets is determined based on a number of MSs that share the CQI channel.

7. The apparatus of claim 5, wherein a number of the allocable modulation vector sequence sets is determined based on a number of reception antennas of the communication system.

* * * * *

UNITED STATES PATENT AND TRADEMARK OFFICE
CERTIFICATE OF CORRECTION

| | | |
|---|---|---|
| PATENT NO. | : 7,613,244 B2 | Page 1 of 1 |
| APPLICATION NO. | : 11/273263 | |
| DATED | : November 3, 2009 | |
| INVENTOR(S) | : Hwang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1023 days.

Signed and Sealed this

Nineteenth Day of October, 2010

David J. Kappos
*Director of the United States Patent and Trademark Office*